(12) United States Patent
Lee et al.

(10) Patent No.: US 7,864,705 B2
(45) Date of Patent: Jan. 4, 2011

(54) METHOD FOR ESTABLISHING COMMUNICATION CHANNEL AND IMAGE RECEIVING APPARATUS USING THE SAME

(75) Inventors: Chang-jin Lee, Suwon-si (KR); Tae-don Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 613 days.

(21) Appl. No.: 11/835,549

(22) Filed: Aug. 8, 2007

(65) Prior Publication Data

US 2008/0170590 A1 Jul. 17, 2008

(30) Foreign Application Priority Data

Jan. 12, 2007 (KR) .................. 10-2007-0004011

(51) Int. Cl.
*H04L 12/28* (2006.01)
*H04Q 7/00* (2006.01)
*H04J 3/16* (2006.01)

(52) U.S. Cl. .................. 370/254; 370/329; 370/437

(58) Field of Classification Search ......... 370/252–254, 370/329, 332, 333, 437
See application file for complete search history.

(56) References Cited

U.S. PATENT DOCUMENTS

| | | | | |
|---|---|---|---|---|
| 5,737,365 A | * | 4/1998 | Gilbert et al. | 375/224 |
| 5,966,186 A | * | 10/1999 | Shigihara et al. | 348/570 |
| 7,221,667 B2 | * | 5/2007 | Hori et al. | 370/338 |
| 7,224,697 B2 | * | 5/2007 | Banerjea et al. | 370/401 |
| 7,538,825 B2 | * | 5/2009 | Kasamatsu et al. | 348/725 |
| 2004/0185887 A1 | * | 9/2004 | Wolman et al. | 455/516 |
| 2005/0063334 A1 | | 3/2005 | Fnu et al. | |
| 2005/0111419 A1 | | 5/2005 | Kwon et al. | |
| 2006/0073847 A1 | | 4/2006 | Pirzada et al. | |
| 2006/0183504 A1 | | 8/2006 | Tanaka et al. | |

FOREIGN PATENT DOCUMENTS

| | | |
|---|---|---|
| EP | 1599062 | 11/2005 |
| WO | 2004053940 A2 | 6/2004 |

* cited by examiner

*Primary Examiner*—Hong Cho
(74) *Attorney, Agent, or Firm*—Sughrue Mion, PLLC

(57) ABSTRACT

A method and apparatus for establishing a communication channel provided. The apparatus includes a storage unit which stores a communication channel search starting point for an address of the apparatus; and a controller which searches a communication channel at the communication channel search starting point set in the address of the apparatus. Accordingly, the probability of establishing the same communication channel may be reduced. As a result, inter-channel interference may also be reduced so that image deterioration may be prevented.

18 Claims, 3 Drawing Sheets

METHOD FOR ESTABLISHING COMMUNICATION CHANNEL AND IMAGE RECEIVING APPARATUS USING THE SAME

CROSS-REFERENCE TO RELATED APPLICATIONS

This application claims priority from Korean Patent Application No. 10-2007-0004011 filed on Jan. 12, 2007 in the Korean Intellectual Property Office, the entire disclosure of which is incorporated herein by reference.

BACKGROUND OF THE INVENTION

1. Field of the Invention

Methods and apparatuses consistent with the present invention relate to a method for establishing a communication channel and an image receiving apparatus using the same, and more particularly, to a method for establishing a communication channel with an image transmitting apparatus by a wirelessly connected image receiving apparatus, and an image receiving apparatus employing the same.

2. Description of the Prior Art

An image receiving apparatus receives an image signal from an image transmitting apparatus having a tuner, and displays an image corresponding to the received image signal. The main image receiving apparatus in the related art is a television (TV), and an example of an image transmitting apparatus is a set-top box.

The image receiving apparatus and the image transmitting apparatus may be connected by wire or wirelessly. If the image receiving apparatus and the image transmitting apparatus are connected by wire, the image receiving apparatus receives the image signal from the image transmitting apparatus through a wire cable, and if the image receiving apparatus and the image transmitting apparatus are connected wirelessly, the image receiving apparatus receives the image signal from the image transmitting apparatus wirelessly. In the related art, an image receiving apparatus and an image transmitting apparatus connected wirelessly are provided in a single set.

FIG. 1 is a view illustrating a method for establishing a communication channel of a related art image receiving apparatus.

Referring to FIG. 1, a TV 100 and a set top box 20 are connected wirelessly as an image receiving apparatus 200 and an image transmitting apparatus respectively. If power is supplied, the TV 100 establishes the communication channel to communicate stably with the set top box 20 connected wirelessly.

In FIG. 1, a plurality of sets may be placed in a factory, a shop, or a home. If power is supplied to a plurality of TVs 100, 120, and 140 and set top boxes 20, 22, and 24 simultaneously, an image is broken due to the same communication channel being shared by at least two TVs among the plurality of TVs 100, 120, and 140.

Particularly if power is supplied, the plurality of TVs 100, 120, and 140 attempt to connect wirelessly with respective set top boxes 20, 22, and 24. If the TV and the set top box are connected wirelessly, the plurality of TVs 100, 120, 140 search the communication channel to communicate stably with respective set top boxes 20, 22, and 24. If a starting time when the plurality of TVs 100, 120, 140 search the communication channel is the same, and the standard to determine the stability of the communication channel is similar, the plurality of TVs 100, 120, and 140 may establish the same communication channel.

While more than two TVs among the plurality of TVs 100, 120, and 140 establish the same communication channel, different image signals are received from the respective set top boxes 20, 22, and 24. As a result, inter-channel interference may occur. For example, the first and second TVs 100 and 120 establish the same communication channel. The first TV 100 may receive the image signal transmitted from the first set top box 20 to channel 7, and the second TV 120 may receive the image signal transmitted from the second set top box 22 to channel 11. Since the first and second TVs 100 and 120 share the same communication channel, the first TV 100 receives the image signal transmitted from the set top box 20 to channel 7 and also the image signal transmitted to channel 11. Different image signals are received by one TV, so the image is not displayed satisfactorily. In other words, a broken image formed by mixing the two images is displayed.

Accordingly, when there are a plurality of sets consisting of an image receiving apparatus and an image transmitting apparatus which communicate wirelessly, a method is required for preventing an image deterioration due to inter-channel interference.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, an aspect of the present invention is to provide a method for establishing a wireless communication channel between a plurality of sets of image receiving apparatuses and image transmitting apparatuses, and an image receiving apparatus incorporating the same.

An additional aspect of the present invention is to provide a method for establishing a wireless communication channel between a plurality of sets of image receiving apparatuses and image transmitting apparatuses, which is capable of preventing an image deterioration due to inter-channel interference.

To achieve the above-described aspect, there is provided a method for establishing communication channel of an image receiving apparatus comprising determining whether an address received from an image transmitting apparatus corresponds to an address of an image receiving apparatus; and searching a communication channel at a communication channel search starting point set in the address of the image receiving apparatus if the received address corresponds to the address of the image receiving apparatus.

The image receiving apparatus may be wirelessly connected with the image transmitting apparatus, and the communication channel is a wireless communication channel.

The address of the image receiving apparatus may be a Media Access Control (MAC) address, and the communication channel search starting point is set differently for respective MAC addresses.

The searching may establish a communication channel having the lowest error rate as the communication channel to communicate with the image transmitting apparatus.

The searching may include: transmitting a plurality of first signals, each corresponding to a different communication channel, from the image receiving apparatus to the image transmitting apparatus; receiving, at the image receiving apparatus, a plurality of second signals, each corresponding to one of the first signals; measuring the intensity of each of the first signals and each of the second signals; calculating an error rate for each of the different communication channels based on the intensity difference between the first signal and the corresponding second signal; and establishing one of the different communication channels as the communication channel for communications based on the calculated error rate.

An image receiving apparatus may comprise a storage unit which stores a communication channel search starting point set for an address of an image receiving apparatus; and a controller which searches a communication channel at the communication channel search starting point set in the address of the image receiving apparatus, if an address received from an image transmitting apparatus corresponds to the address of the image receiving apparatus.

The image receiving apparatus may be wirelessly connected with the image transmitting apparatus, and the communication channel is a wireless communication channel.

The address of the image receiving apparatus may comprise a MAC address, and the communication channel search starting point is set differently for respective MAC addresses.

The controller may search the communication channel at the stored communication channel search starting point, and establish a communication channel having the lowest error rate as the communication channel to communicate with the image transmitting apparatus.

The image receiving apparatus may further comprise a receiver which receives a communication request signal including the MAC address from the image transmitting apparatus, and receives the image signal from the image transmitting apparatus through the established communication channel.

The lowest error rate may be determined based on a measured difference in intensity between a signal transmitted from the image receiving apparatus and a signal received by the image receiving apparatus.

A broadcast receiving apparatus may comprise a plurality of image transmitting apparatuses which transmit a communication request signal; and a plurality of image receiving apparatuses which correspond respectively to the plurality of image transmitting apparatuses, and each of the image receiving apparatus searches a communication channel at a communication channel search starting point set at the address of each respective image receiving apparatus, if an address included in the communication request signal transmitted from the image transmitting apparatus corresponds to the address of the image receiving apparatus.

The image receiving apparatuses may be wirelessly connected with the image transmitting apparatuses, and each communication channel may be a wireless communication channel.

The address of the image receiving apparatus may be a MAC address, and the communication channel search starting point is differently set for respective MAC address.

The image transmitting apparatus may comprise a set top box, and the image receiving apparatus comprises a television (TV).

BRIEF DESCRIPTION OF THE DRAWINGS

The above and other aspects of the present invention will become apparatus and more readily appreciated from the following description of the exemplary embodiments, taken in conjunction with the accompany drawings of which.

DETAILED DESCRIPTION OF EXEMPLARY EMBODIMENTS

Certain exemplary embodiments of the present invention will now be described in greater detail with reference to the accompanying drawings.

Figure 1:
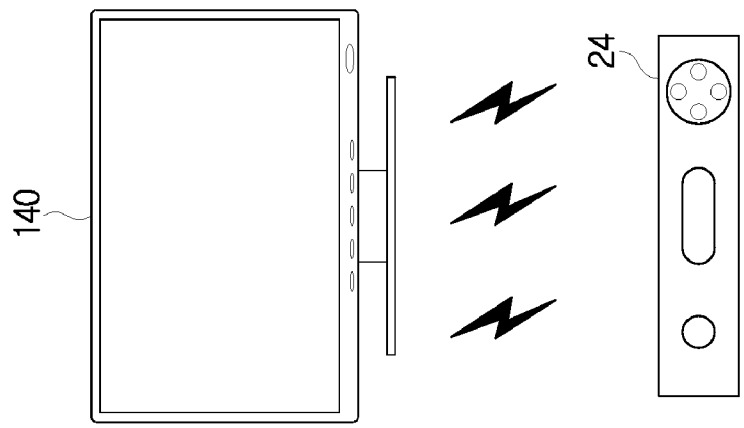
FIG. 1 is a view illustrating a method for establishing a communication channel in a image receiving apparatus in the related art.
Figure 1:
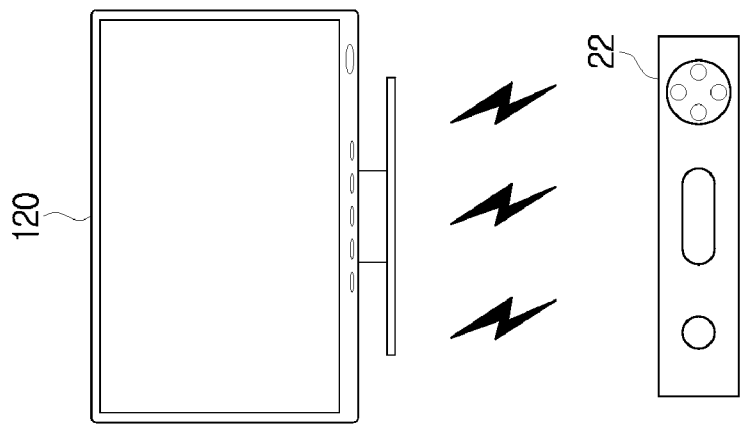
Figure 1:
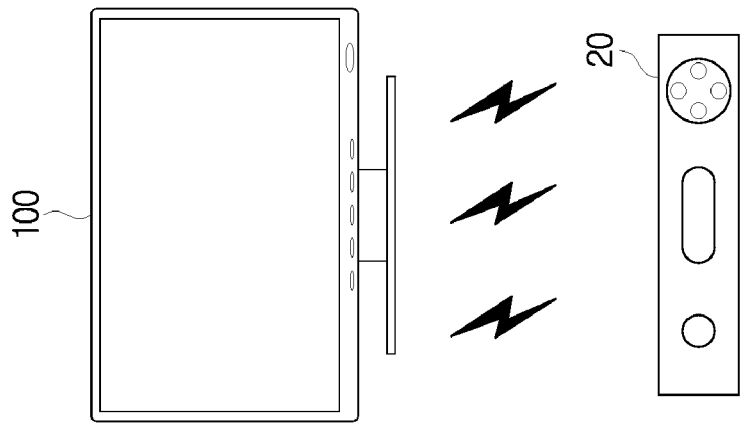
Figure 2:
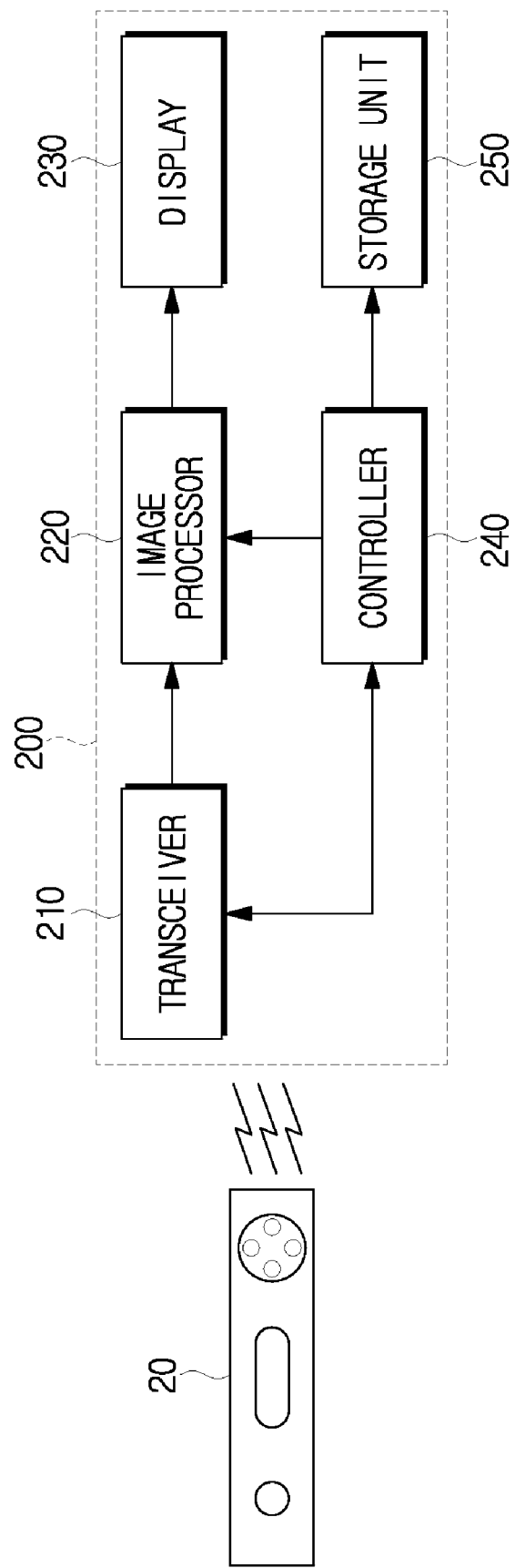
FIG. 2 is a block diagram of an image receiving apparatus according to an exemplary embodiment of the present invention.

FIG. 2 is a block diagram of an image receiving apparatus according to an exemplary embodiment of the present invention.

A TV 200 is connected wirelessly to a set top box 20. The TV 200 is an example of an image receiving apparatus for establishing a communication channel to communicate stably with the set top box 20 by searching for a communication channel at the preset channel search starting point.

Referring to FIG. 2, the TV 200 may comprise a transceiver 210, an image processor 220, a display 230, a controller 240, and a storage unit 250.

The transceiver 210 is a wireless module providing a wireless interface which communicates wirelessly with the set top box 20, and it receives a communication request signal including a MAC address from the set top box 20. Also, the transceiver 210 transmits a response signal including information on an established communication channel to the set top box 20, and receives the image signal through the established communication channel from the set top box 20.

The image processor 220 processes the image signal received through the transceiver 210, and then displays an image corresponding to the processed image signal on the display 230.

If power is supplied, the controller 240 starts communication with the set top box 20 through the transceiver 210. In particular, the controller 240 determines whether or not the MAC address included in the communication request signal received through the transceiver unit 210 corresponds to the MAC address of the TV 200. If the MAC addresses correspond to each other, the controller 240 starts searching for a communication channel from the channel search starting point set in the MAC address of the TV 200.

The controller 240 establishes, i.e., selects, the most stable communication channel as the communication channel to communicate with the set top box 20, and controls the transceiver 210 to transmit the response signal including the information on the established communication channel to the set top box 20.

The storage 250 unit stores the MAC address and the channel search starting point set at the MAC address.

Figure 3:
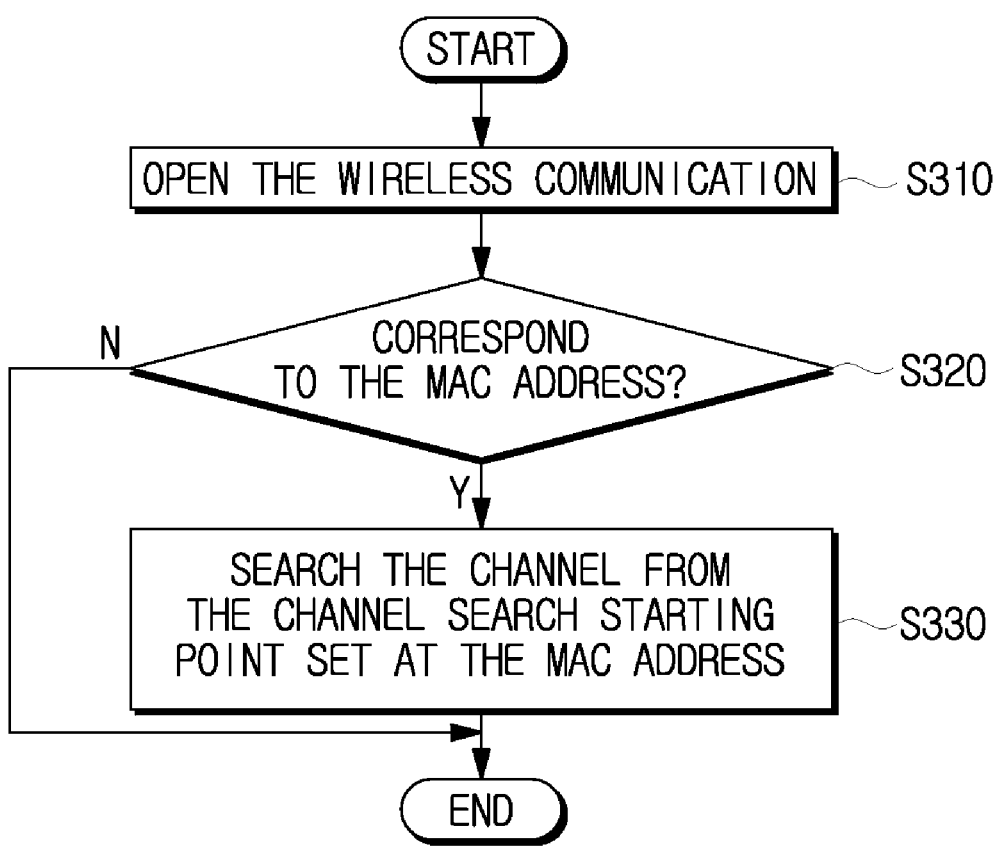
FIG. 3 is a flowchart illustrating a method for establishing a communication channel in an image receiving apparatus according to an exemplary embodiment of the present invention.

FIG. 3 is a flowchart to explain the method for establishing the communication channel of the image receiving apparatus according to an exemplary embodiment of the present invention.

Referring to FIG. 3, the wireless communication opens between the set of the set top box 20 and the TV 200 (S310). The set top box 20 transmits the communication request signal including the MAC address to the TV 200. The MAC address included in the communication request signal is the unique MAC address of the TV 200 which operates as the counterpart to the set top box 20. The set top box 20 is already aware of the MAC address of the counterpart TV 200.

The controller 240 of the TV 200 determines whether or not the MAC address included in the communication request signal received through the transceiver unit 210 corresponds to the MAC address of the TV 200 (S320). If the MAC address included in the communication request signal corresponds to the MAC address of the TV, the controller 240 determines that the TV 200 is the counterpart of the set top box 20.

If the MAC addresses correspond to each other, the controller 240 starts searching for a communication channel from the preset channel search starting point (S330). Also, the controller 240 establishes the communication channel which is appropriate for stable communication, as a communication channel to communicate with the set top box 20.

That is, the controller 240 transmits the predetermined signal through the communication channel to the set top box 20. If a signal is received from the set top box 20 through the communication channel which transmits the predetermined signal, the controller 240 measures the intensity of the received signal. The controller 240 calculates the error rate by using the difference in intensity between the transmitted signal and the received signal.

The controller 240 calculates the error rate for each of the communication channels. In an embodiment the controller 240 may calculate the error rates of all the available communication channels. After calculating the error rates, the controller 240 establishes the communication channel having the lowest error rate as the communication channel to communicate with the set top box 20.

The preset channel search starting point is set for the unique MAC address of the TV 200. That is, each unique MAC address sets a different channel search starting point.

It is explained that each of the plurality of TVs 200, 220, and 240 corresponding to each of the plurality of set top boxes 20, 22, and 24 are provided as a set. For example, the MAC address of the first TV 200 is OA, the MAC address of the second TV 220 is OB, and the MAC address of the third TV 240 is OC. The number of communication channels is assumed to be 8.

According to an exemplary embodiment of the present invention, different channel search starting points are set for the respective unique MAC addresses.

That is, a first communication channel is set in the OA of the MAC address of the first TV 200 as a channel search starting point, a second communication channel is set in the OB of the MAC address of the second TV 220 as another channel search starting point, and a third communication channel is set in the OC of the MAC address of the third TV 240 as a third channel search starting point.

If there is a plurality of sets consisting of a TV 200 and a set top box 20 for a wireless communication, the channel search starting points differ in each set so that the probability of establishing the same communication channel may be reduced. As a result, inter-channel interference generated by establishing the same communication channel or neighboring channels may also be reduced.

Although a set top box 20 and a TV 200 connected wirelessly are described, this is merely an exemplary embodiment of the present invention. The present invention may be used in any image signal receiving apparatus, or apparatus displaying an image by receiving the image signal from the image signal receiving apparatus. Also, because the set top box 20 and the TV 200 are formed as a wirelessly connected set, it is applicable to a broadcast receiving apparatus incorporating therein a set including a set top box 20 and a TV 200.

As set forth above, the probability of establishing the same communication channel may be reduced so that the chances that the image is broken may also reduced by reducing the interference between the communication channels.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method for establishing a communication channel of an image receiving apparatus comprising:
   determining, by the image receiving apparatus, whether an address received from an image transmitting apparatus corresponds to an address of the image receiving apparatus; and
   searching, by the image receiving apparatus, for a communication channel from a communication channel search starting point set differently from other image receiving apparatuses based on the address of the image receiving apparatus, if the received address corresponds to the address of the image receiving apparatus.

2. The method of claim 1, wherein the image receiving apparatus is wirelessly connected with the image transmitting apparatus, and the communication channel is a wireless communication channel.

3. The method of claim 1, wherein the address of the image receiving apparatus is a MAC address, and the communication channel search starting point is set differently for respective MAC addresses.

4. The method of claim 1, wherein the searching establishes a communication channel having the lowest error rate as the communication channel to communicate with the image transmitting apparatus.

5. The method of claim 1, wherein the searching comprises:
   transmitting a plurality of first signals, each corresponding to a different communication channel, from the image receiving apparatus to the image transmitting apparatus;
   receiving, at the image receiving apparatus, a plurality of second signals, each corresponding to one of the first signals;
   measuring the intensity of each of the first signals and each of the second signals;
   calculating an error rate for each of the different communication channels based on the intensity difference between the first signal and the corresponding second signal;
   establishing one of the different communication channels as the communication channel for communications based on the calculated error rate.

6. The method according to claim 1, wherein the communication channel starting point is set in the address of the image receiving apparatus.

7. An image receiving apparatus comprising:
   a storage unit which stores a communication channel search starting point set for an address of the image receiving apparatus; and
   a controller which searches for a communication channel from the communication channel search starting point set based on the address of the image receiving apparatus, if an address received from an image transmitting apparatus corresponds to the address of the image receiving apparatus.

8. The image receiving apparatus of claim 7, wherein the image receiving apparatus is wirelessly connected with the image transmitting apparatus, and the communication channel is a wireless communication channel.

9. The image receiving apparatus of claim 7, wherein the address of the image receiving apparatus comprises a MAC address, and the communication channel search starting point is set differently for respective MAC addresses.

10. The image receiving apparatus of claim 9, further comprising:
a receiver which receives a communication request signal including the MAC address from the image transmitting apparatus, and receives the image signal from the image transmitting apparatus through the established communication channel.

11. The image receiving apparatus of claim 7, wherein the controller searches the communication channel at the stored communication channel search starting point, and establishes a communication channel having the lowest error rate as the communication channel to communicate with the image transmitting apparatus.

12. The image receiving apparatus of claim 11, wherein the lowest error rate is determined based on a measured difference in intensity between a signal transmitted from the image receiving apparatus and a signal received by the image receiving apparatus.

13. The image receiving apparatus according to claim 7, wherein the communication channel starting point is set in the address of the image receiving apparatus.

14. A broadcast receiving system comprising:
a plurality of image transmitting apparatuses which transmit a communication request signal; and
a plurality of image receiving apparatuses which correspond respectively to the plurality of image transmitting apparatuses, and each of the image receiving apparatuses search for a communication channel from a communication channel search starting point set based on the address of each respective image receiving apparatus, if an address included in the communication request signal transmitted from the image transmitting apparatus corresponds to the address of the image receiving apparatus.

15. The broadcast receiving apparatus of claim 14, wherein the image receiving apparatuses are wirelessly connected with the image transmitting apparatuses, and each communication channel is a wireless communication channel.

16. The broadcast receiving apparatus of claim 14, wherein the address of the image receiving apparatus is a MAC address, and the communication channel search starting point is set differently for respective MAC address.

17. The broadcast receiving apparatus of claim 14, wherein the image transmitting apparatus comprises a set top box, and the image receiving apparatus comprises a television (TV).

18. The broadcast receiving system according to claim 14, wherein the communication channel starting point is set in the address of each respective image receiving apparatus.

* * * * *